United States Patent
Varghese

(10) Patent No.: US 10,567,963 B2
(45) Date of Patent: Feb. 18, 2020

(54) SYSTEM FOR AUTHORIZING ACCESS TO RESOURCES AND DISTRIBUTING RESOURCE PROVIDER DEVICES

(71) Applicant: VISA INTERNATIONAL SERVICE ASSOCIATION, San Francisco, CA (US)

(72) Inventor: Jacob Varghese, Foster City, CA (US)

(73) Assignee: Visa International Service Association, San Francisco, CA (US)

( * ) Notice: Subject to any disclaimer, the term of this patent is extended or adjusted under 35 U.S.C. 154(b) by 85 days.

(21) Appl. No.: 15/085,473

(22) Filed: Mar. 30, 2016

(65) Prior Publication Data

US 2016/0294727 A1 Oct. 6, 2016

Related U.S. Application Data

(60) Provisional application No. 62/140,687, filed on Mar. 31, 2015.

(51) Int. Cl.
  *G06F 15/173* (2006.01)
  *H04W 12/08* (2009.01)
  *H04L 12/14* (2006.01)

(52) U.S. Cl.
  CPC ......... *H04W 12/08* (2013.01); *H04L 12/1464* (2013.01); *H04L 12/1457* (2013.01)

(58) Field of Classification Search
  CPC .............................. G06Q 10/02; H04L 63/101
  See application file for complete search history.

(56) References Cited

U.S. PATENT DOCUMENTS

| | | | | |
|---|---|---|---|---|
| 7,529,700 | B1 * | 5/2009 | Kessler | G06Q 40/02 705/2 |
| 9,613,377 | B2 * | 4/2017 | Sheets | G06Q 40/02 |
| 2004/0243519 | A1 * | 12/2004 | Perttila | G06Q 20/20 705/75 |
| 2008/0228648 | A1 | 9/2008 | Kemper | |
| 2009/0204511 | A1 * | 8/2009 | Tsang | G06Q 30/02 705/26.1 |
| 2009/0260064 | A1 * | 10/2009 | McDowell | G06F 21/10 726/4 |
| 2010/0161484 | A1 | 6/2010 | Leggatt et al. | |
| 2011/0166992 | A1 | 7/2011 | Dessert et al. | |
| 2011/0302018 | A1 * | 12/2011 | Norcross | G06Q 30/02 705/14.26 |

(Continued)

FOREIGN PATENT DOCUMENTS

SG 10201602536V 10/2016

OTHER PUBLICATIONS

Giftcard.com, Complete Guide to Gift Cards for Small Businesses http://www.giftcards.com, 1999-2015, 26 pages.
Written Opinion for SG10201602536V dated Sep. 20, 2018, 8 pages.

*Primary Examiner* — Dhairya A Patel
(74) *Attorney, Agent, or Firm* — Kilpatrick Townsend & Stockton LLP

(57) ABSTRACT

Embodiments of the invention are directed to identifying information about a resource provider for a future transaction of a resource, when the provider is unaware and/or does not provide the information. The information can identify a unique resource provider code from a plurality of resource provider codes that helps allow the resource provider to settle the future transaction for the resource using the resource provider code.

21 Claims, 7 Drawing Sheets

(56) References Cited

U.S. PATENT DOCUMENTS

| | | |
|---|---|---|
| 2012/0066044 A1 | 3/2012 | Honnef |
| 2012/0303516 A1* | 11/2012 | Fellig .................... G06Q 20/10 |
| | | 705/39 |
| 2014/0056526 A1* | 2/2014 | Scipioni ................ G06T 1/0021 |
| | | 382/192 |
| 2014/0081783 A1* | 3/2014 | Paranjape .............. G06Q 20/20 |
| | | 705/21 |
| 2014/0114800 A1 | 4/2014 | Levitt et al. |
| 2014/0156388 A1* | 6/2014 | Winters ............. G06Q 30/0246 |
| | | 705/14.45 |
| 2014/0279477 A1* | 9/2014 | Sheets ................... G06Q 40/02 |
| | | 705/41 |
| 2015/0142561 A1* | 5/2015 | Gerard .............. G06Q 30/0261 |
| | | 705/14.53 |
| 2015/0199686 A1* | 7/2015 | Bavirisetty .......... G06Q 20/401 |
| | | 705/44 |
| 2016/0148212 A1* | 5/2016 | Dimmick ........... G06Q 20/4014 |
| | | 705/44 |
| 2016/0189062 A1* | 6/2016 | Forss .................... G06Q 10/02 |
| | | 705/5 |
| 2016/0217456 A1* | 7/2016 | Gaur .................... G06Q 20/385 |
| 2016/0217462 A1* | 7/2016 | Gaur .................... G06Q 20/385 |
| 2016/0227401 A1* | 8/2016 | Otero .................... H04W 12/04 |
| 2018/0198876 A1* | 7/2018 | Ma ........................ G06O 30/02 |

* cited by examiner

SYSTEM FOR AUTHORIZING ACCESS TO RESOURCES AND DISTRIBUTING RESOURCE PROVIDER DEVICES

CROSS REFERENCE TO RELATED APPLICATIONS

This application claims the benefit of U.S. Provisional Application No. 62/140,687, filed Mar. 31, 2015, which is incorporated by references in its entirety for all purposes.

BACKGROUND

Authorization to access resources is often limited. For example, a resource may correspond with a seat in a venue. A resource provider may limit access to the seat by providing a physical ticket to users. A user can receive the physical ticket from the resource provider and, when the user provides the physical ticket to the venue operator, the user may be allowed access to the seat.

In some embodiments, a resource provider may be limited to providing physical tickets (e.g., based on constraints set by their computing systems, etc.). In some instances, the resource provider may be small and not appreciate the benefit of providing tickets in other forms. Users that want access to the seat in the venue would be limited to methods identified by the resource provider with little recourse to access the seat otherwise.

Embodiments of the invention address this and other problems, individually and collectively.

BRIEF SUMMARY

Embodiments of the invention are directed to authorizing access to a resource without the approval or knowledge of the resource provider. Specific embodiments of the present invention relate to systems and methods for identifying a resource provider for a future transaction and, once identified, generating an account identifier to access the resource provided by the resource provider. For example, a user can request access to the resource by providing a computer with information about the resource provider that customarily provides the access. The information can be used to identify a unique resource provider code from a plurality of resource provider codes where the codes (when presented to the resource provider) allow each corresponding resource provider to settle future transactions for the resource, even though the actual resource provider (or its proxy) did not generate the account identifier.

One embodiment of the invention is directed to a receiving, by a server computer, from a user device, information identifying a resource provider. The method can access a plurality of resource provider codes in a database. The information may be matched for identifying the resource provider with at least one resource provider code from the plurality of resource provider codes. The resource provider code may be used during settlement of a future transaction. The method may determine an account identifier. In some examples, the account identifier may correspond with a particular resource provider. The server computer may provide the account identifier to the user or a receiver, where the account identifier is used during the future transaction.

An illustrative example includes conducting an authorization process to enter a venue. A server computer may be implemented that is different than the computer used by the resource provider. The server computer can receive information identifying the resource provider (e.g., name, location, etc.) and access a database of resource providers. The information identifying the resource provider can be matched with a code associated with the resource provider that is used during settlement of a future transaction. When the server computer determines the resource provider code, the server computer can then determine an account identifier. Thus, the user may use the account identifier to enter the venue and access the seat, without the resource provider generating the account identifier for the user. When the future transaction is performed, the future transaction may include presenting the newly generated account identifier at an entrance gate of the venue, and entering the venue when the account identifier is authorized.

Another illustrative example includes generating an account identifier (e.g., gift card, stored value account identifier, virtual gift card, plastic/printed paper gift receipt, etc.) without a resource provider identifying itself or pre-enrolling with a computer that issues the account identifier for a future transaction. For example, the server computer may identify resource providers by receiving information from a transport computer associated with many resource providers, analyzing previous transactions where resource providers participated, or determining resource provider information from passive communications with the resource provider (e.g., available through the resource provider's website or publicly-available information, etc.). This may help generate a database of resource provider information. The user can identify a desired resource provider using the resource provider's website, phone, mailing address, or other resource provider information. The systems and methods can match that information with the stored resource provider information, and eventually to a resource provider code, without requiring the resource provider to enroll with the system. Later, the user may request an account identifier that can be used to access to a resource offered by the identified resource provider, and this request can be made without the knowledge of the resource provider These and other embodiments of the invention are described in further detail below.

BRIEF DESCRIPTION OF THE DRAWINGS

FIG. 5 shows an exemplary transaction message according to embodiments of the present invention.

DETAILED DESCRIPTION

Figure 1:
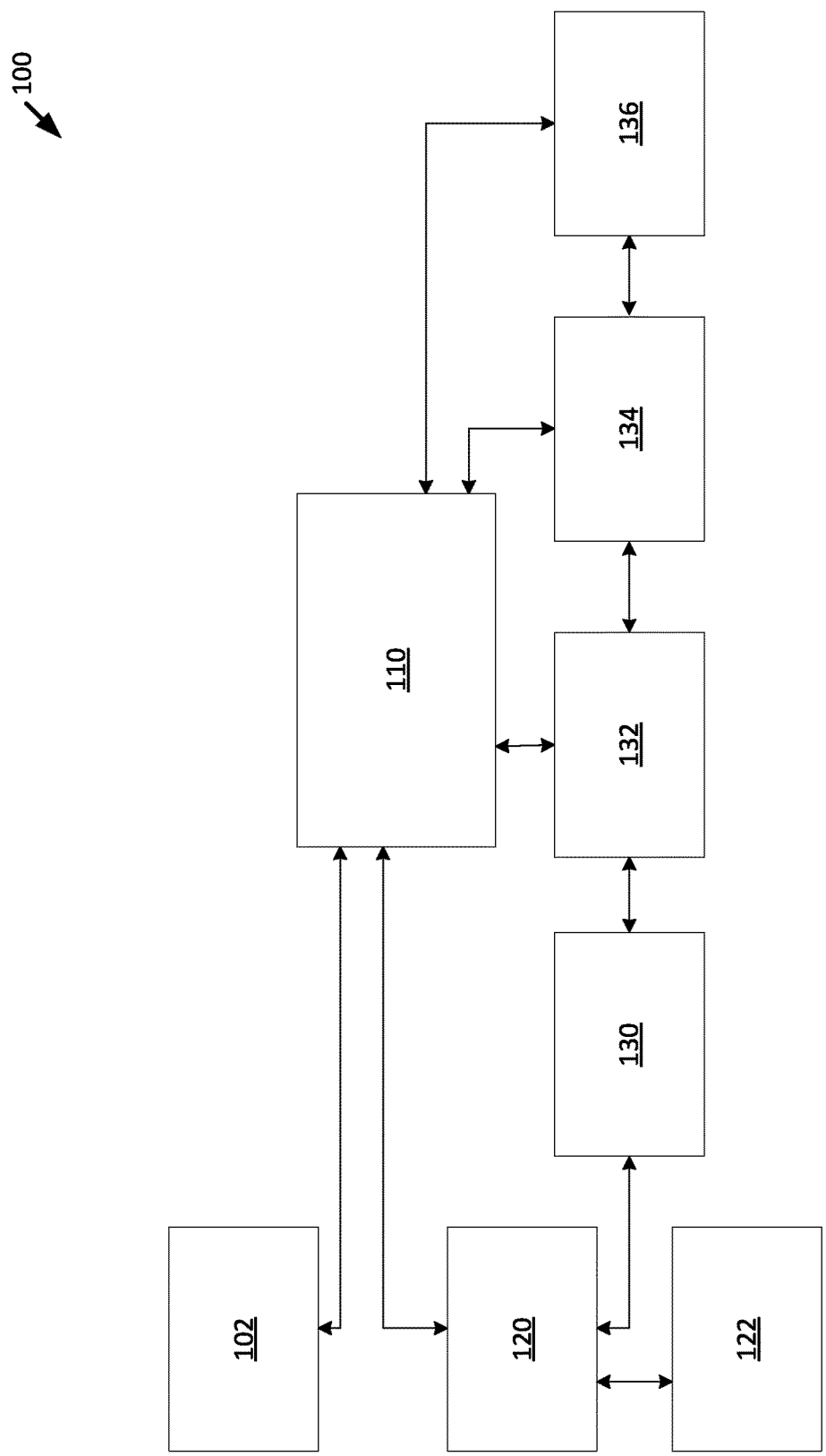
FIG. 1 illustrates a block diagram of a system according to an embodiment of the invention.

Some embodiments of the present invention relate to systems and methods for enabling access to a resource, where the resource provider may not know that the access to the resource is being provided through the separate system.

Before discussing specific embodiments and examples, some descriptions of terms used herein are provided below.

A "server computer" can include a computer or cluster of computers. For example, the server computer can be a mainframe, a minicomputer cluster, or a group of servers functioning as a unit. In one example, a server computer may be a database server coupled to a Web server. Data transfer and other communications between components such as computers may occur via any suitable wired or wireless network, such as the Internet or private networks.

In some embodiments, an "acquirer" or "acquirer computer" (which may be an example of a transport computer 132) is typically a business entity (e.g., a commercial bank) that has a business relationship with a particular resource provider or resource provider computer. An "issuer" or "issuer computer" (which may be an example of an authorizing computer 136 or issuance server computer 110, which may be implemented as one computer, etc.) is typically a business entity (e.g., a bank or credit union) which issues an account identifier (e.g., a physical ticket to a venue, a stored value device, prepaid device, credit card, debit card, smart card, or contactless device). It may provide administrative and management functions for the account. Some entities may perform both issuer and acquirer functions. An account identifier may correspond with any account usable in a transaction, such as accessing a venue or performing a payment transaction with a stored value, prepaid, credit, or debit account.

An "authorization request message" may be an electronic message that is sent to a processing network computer 134 and/or an authorizing computer 136 to request authorization for a transaction. An authorization request message according to some embodiments may comply with (International Organization of Standardization) ISO 8583, which is a standard for systems that exchange electronic transaction information associated with a transaction made by a user using a user device (e.g., payment device) or account (e.g., payment account). The authorization request message may include an account identifier that may be associated with the user device or account. An authorization request message may also comprise additional data elements corresponding to "identification information" including, by way of example only: a service code, a CVV (card verification value), a dCVV (dynamic card verification value), an expiration date, etc. An authorization request message may also comprise "transaction information," such as any information associated with a current transaction, such as the transaction amount, resource provider identifier, resource provider location, etc., as well as any other information that may be utilized in determining whether to identify and/or authorize a transaction.

An "authorization response message" may be an electronic message reply to an authorization request message generated by an authorizing computer or a processing network computer. The authorization response message may include, by way of example only, one or more of the following status indicators: Approval—transaction was approved; Decline—transaction was not approved. The authorization response message may also include an authorization code, which may be a code that the authorizing computer returns in response to an authorization request message in an electronic message (either directly or through the processing network) to the resource provider's access device (e.g. POS equipment) that indicates approval of the transaction. The code may serve as proof of authorization. As noted above, in some embodiments, a processing network may generate or forward the authorization response message to the resource provider computer.

A "resource provider" may be an entity that can provide a resource such as goods, services, information, and/or access. Examples of a resource provider include venue providers (e.g., providing seats for concerts and events, etc.), merchants, access devices, secure data access points, etc. In some cases, the resource provider may operate a physical store and utilize an access device for in-person transactions. The resource provider may also sell goods and/or services via a website or other network page, and may accept transactions and/or account identifiers over the Internet.

Existing technologies have been developed to allow access to resources. For example, an account identifier (e.g., unique ticket number, unique payment account identifier, etc.) may allow access to the resource and may be generated by a resource provider. The resource provider that provides access to the particular resource may implement a system to generate the account identifiers. When used, for example, the account identifier can allow the user of the account identifier to access a seat in a venue (e.g., a physical ticket to access the venue, a gift card to purchase goods and services, etc.) or other automated access to a resource.

Systems have also been developed to help the resource provider provide these account identifiers as gifts through a proxy. For example, the proxy system can allow a user to request an account identifier for a receiver user that would like to access the resource. Once the account identifier is generated, the requesting user can offer the account identifier to the receiving user. As illustrated, the receiving user can then use the account identifier to gain access to the venue, purchase goods from the resource provider, or give the purchased account identifier to another user that receives the account identifier for their own use from the proxy system.

However, some resource providers may be small, may not want to issue account identifiers as gifts (e.g., instead, issuing physical tickets for the user rather than issuing an account identifier for a receiver where the resource provider is unable to check the receiver's identification, etc.). The resource provider may also not want to enroll with this proxy system. Additionally, the user may not want to visit a brick-and-mortar resource provider to obtain the account identifier (e.g., associated with the physical ticket, etc.). It may be difficult to offer fraud protection or other features for these resource providers, causing the resource provider to not realize benefits from increased access to these account identifiers.

Accordingly, there is a need for a system to provide access to these account identifiers even when the resource provider does not enroll with the system.

Embodiments of the invention address these and other problems, individually and collectively.

FIG. 1 illustrates an exemplary system 100 according to an embodiment of the invention.

In some embodiments, a user device 102 such as a portable communication device (which may be a mobile device) interfaces with an issuance server computer 110 to request issuance of an account identifier for a receiver device 120. The user device 102 and/or receiver device 120 may be, for example, a mobile device such as a cellular or wireless telephone (e.g., a smartphone), personal digital assistant (PDA), portable computer (e.g., tablet or laptop computer), pager, or other portable device carried by the user account holder. The receiver device 120 may be used by a person receiving an account generated by the issuance server computer 110. The system may also include a resource device 122 which may be a prepaid card.

Figure 2:
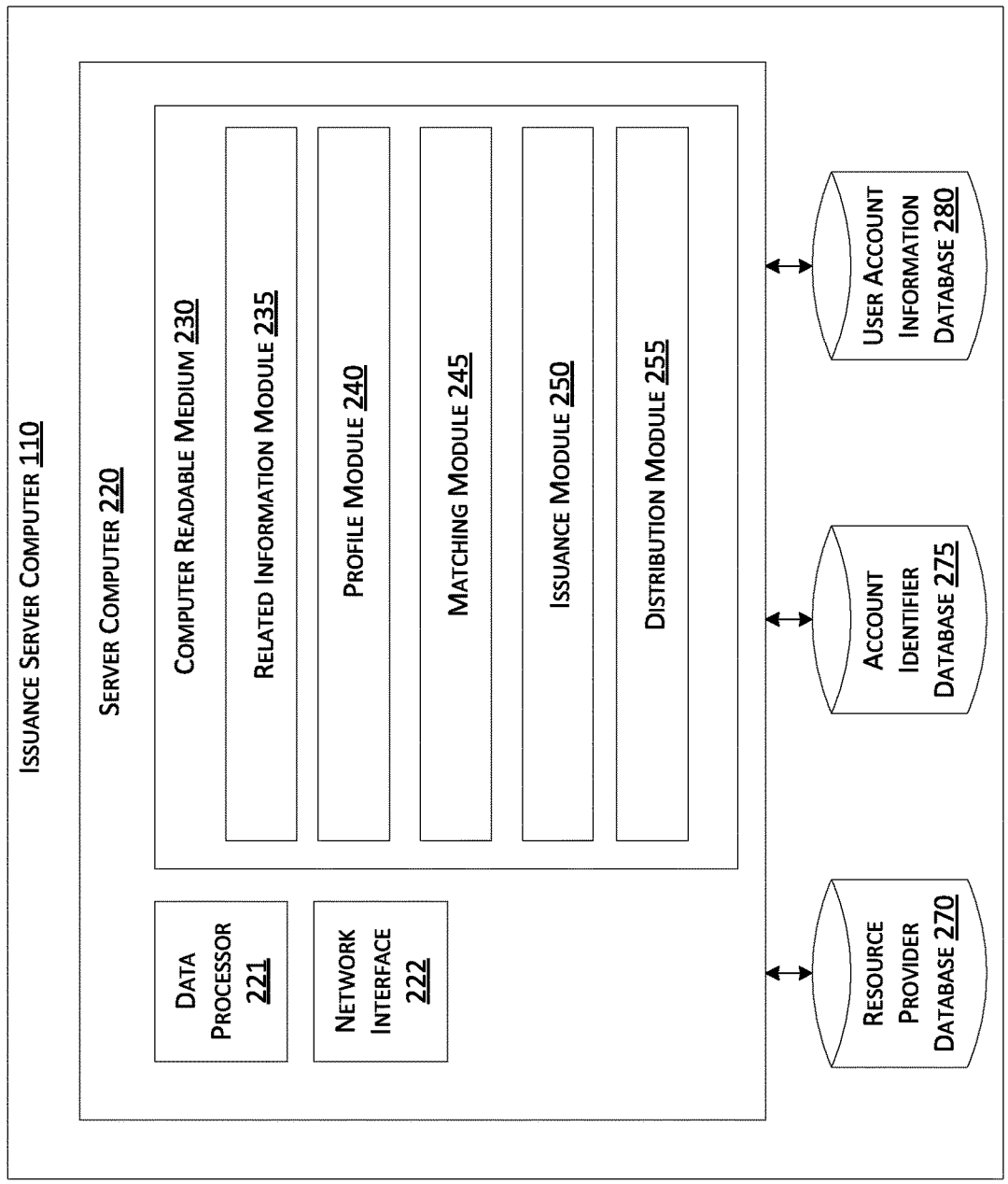
FIG. 2 illustrates a block diagram of an issuance server computer according to an embodiment of the invention.

The issuance server computer 110 may include any software modules that are capable of performing the methods and functionality described herein. In some embodiments, the issuance server computer 110 may be configured to manage, determine, and communicate with the user device 102, receiver device 120, transport computer 132, processing network computer 134, authorizing computer 136, and/or one or more databases, as illustrated in FIG. 2. It may be also be configured to issue the resource device 122 (e.g., a prepaid card).

The resource provider computer 130 may include, for example, an access device. Examples of access devices include point of sale (POS) devices, cellular phones, PDAs, personal computers, tablets, handheld specialized readers, set-top boxes, electronic cash registers, automated teller machines (ATMs), virtual cash registers, kiosks, security systems, access systems, and the like. A resource provider computer 130 could also be a merchant computer running a merchant Web site.

The processing network computer 134 may be a payment network and may comprise one or more servers, data processing subsystems, networks, and operations used to support and deliver authorization services, exception file services, and clearing and settlement services. The processing network computer 134 may be able to process one or more of transactions, credit card transactions, debit card transactions, or any other type of commercial transaction. An exemplary processing network may include, for example, VisaNet™.

FIG. 2 shows a block diagram of an exemplary issuance server computer 110 according to embodiments of the present invention. Issuance server computer 110 includes a server computer 220 comprising a data processor 221, network interface 222, and a computer readable medium 230. The computer readable medium 230 may comprise a number of software modules including related information module 235, a profile module 240, a matching module 245, an issuance module 250, and a distribution module 255.

Other modules and submodules may also reside on the computer readable medium 230. Examples of additional modules may include an authorization module for processing and routing authorization request and response messages, a clearing and settlement module for processing and routing clearing messages and performing settlement between parties, and data extraction (e.g., for retrieving data from external data sources such as databases) modules, storage modules, and message modification modules. Each module in issuance server computer 110 may be combined with any of the additional modules as appropriate. Each module in issuance server computer 110 may comprise one or more submodules, where each submodule may comprise one or more functions implemented by code, executable by data processor 221.

Issuance server computer 110 may also comprise several databases, including a resource provider database 270, an account identifier database 275, and a user account information database 280. Each database may be a conventional, fault tolerant, relational, scalable, secure database such as those commercially available from Oracle™ or Sybase™. In some embodiments, any of the databases may be combined into a single database, or may be separated into multiple databases. Issuance server computer 110 may have other databases that are not shown in FIG. 2.

Data processor 221 (e.g., a microprocessor) may process functions of server computer 220. Data processor 221 may include hardware within user device 202 that can carry out instructions embodied as code in a computer-readable medium. Data processor 221 may be a central processing unit (CPU). As used herein, a processor can include a single-core processor, a plurality of single-core processors, a multi-core processor, a plurality of multi-core processors, or any other suitable combination of hardware configured to perform arithmetical, logical, and/or input/output operations of a computing device.

Network interface 222 may be any suitable combination of hardware and software that enables data to be transferred to and from issuance server computer 110. Network interface 222 may enable issuance server computer 110 to communicate data to and from another device (e.g., resource provider computer 130, transport computer 132, authorizing computer 136, etc.). Some examples of network interface 222 may include a modem, a physical network interface (such as an Ethernet card or other Network Interface Card (NIC)), a virtual network interface, a communications port, a Personal Computer Memory Card International Association (PCMCIA) slot and card, or the like. The wireless protocols enabled by network interface 222 may include Wi-Fi™.

Data transferred via network interface 222 may be in the form of signals which may be electrical, electromagnetic, optical, or any other signal capable of being received by the external communications interface (collectively referred to as "electronic signals" or "electronic messages"). These electronic messages that may comprise data or instructions may be provided between network interface 222 and other devices via a communications path or channel. As noted above, any suitable communication path or channel may be used such as, for instance, a wire or cable, fiber optics, a telephone line, a cellular link, a radio frequency (RF) link, a WAN or LAN network, the Internet, or any other suitable medium.

The issuance server computer 110 may implement a related information module 235. The related information module 235 may, in conjunction with the data processor 221, receive or determine information to identify a resource provider. The information may be identified from publicly-available information, including a resource provider's website, phone number, email or physical address, business name, image of the business or logo, directory, or other information. In some embodiments, the related information module 235 may be programmed to cause the issuance server computer 110 to interact with a transport computer 132 associated with a plurality of resource providers to receive resource provider information associated with one or more of these resource providers (e.g., via an application programming interface (API), a data file, previous transactions, etc.).

The related information module 235 and the data processor 221 may be configured to intercept transactions by other users and determine resource provider information from authorization messages transmitted during those transactions. For example, the related information module 235 can receive an authorization message for a transaction between a second user and a resource provider (e.g., a merchant). The resource provider code (e.g., a merchant identification code) may be determined from the authorization message. The information can be saved with the resource provider database 270 (e.g., a merchant provider database).

The related information module 235 and the data processor 221 may be configured to interact with a third party computer to identify resource provider information. For example, the third party computer may be a web crawler that may be implemented to receive the resource provider information (e.g., merchant information). The web crawler or other substantially automated process may visit a plurality of network pages to identify resource provider information and return the information to the related information module 235.

The issuance server computer 110 may implement a profile module 240. The profile module 240 and the data processor 221 may maintain a profile for a user device 102, receiver device 120, or other devices discussed herein. For example, when a user device requests a new account identifier for a receiver device 120, the profile module 240 and the data processor 221 may generate a profile for that receiver (e.g., a recipient of a gift card). In another example, an account identifier (e.g., a gift card account number) may be associated with the receiver, such that when a new account identifier is requested for a pre-existing receiver, the new account identifier can be associated with the receiver.

In some examples, the receiver can access multiple account identifiers through a single account identifier. When the new account identifier is received, the profile module 240 may, in conjunction with the data processor 221, be configured to update the profile (e.g., stored with user account information database 280, etc.) to include the new account identifier. The account identifier associated with the profile can be used to purchase goods and services at the new resource provider, along with any existing resource providers.

The profile module 240 may be configured to maintain a profile for a resource provider as well. When the resource provider information is received from the user, web crawler, or other information source, the profile module 240 may be configured to generate or update the profile of the resource provider (e.g., stored with resource provider database 270, etc.) to include the new or updated information.

The issuance server computer 110 may implement a matching module 245. The matching module 245 may correlate, in conjunction with data processor 221, stored information with received information by identifying when the two sources are the same. For example, the user may provide a name (e.g., a merchant name) and uniform resource locator (URL) (e.g., a merchant URL) that corresponds with a resource provider (e.g., a merchant). The matching module 245 can identify one or more resource providers in the resource provider database 270 that share that name. The account identifier may be issued for that set of resource providers. In some examples, both the name and the URL may correspond with a resource provider. In some examples, only one resource provider may correspond with the account identifier.

The matching module 245 and the data processor 221 may be configured to parse or compare information from multiple sources to find a match, in conjunction with data processor 221. For example, an authorization request message may identify a new resource provider code that was not previously stored with the resource provider database 270 (e.g., as identified by searching the existing codes in the database, etc.). The resource provider code may be added if it was not already present in the resource provider database 270. When the code is already in the database, an additional code may not be added.

The matching module 245 may be configured to provide options of resource providers to help determine which resource provider is the appropriate resource provider to match with the account identifier. For example, the name provided by the user wishing to provide a gift card to a gift card recipient may correspond with ten resource providers. Each resource provider may be located at a different physical address. The matching module 245 may provide the addresses to the user so that the user can select which resource provider to identify with the account identifier.

The issuance server computer 110 may implement an issuance module 250. In some embodiments, the issuance module 250 and the data processor 221 may interact with an authorizing computer 136 associated with an account of the user device 102. The issuance module 250 and the data processor 221 may be configured to determine whether the account of the user has enough funds to request a valid account identifier. If so, the authorizing computer 136 may transmit approval to the issuance module 250.

The issuance module 250 and the data processor 221 may be configured to generate, in conjunction with data processor 221, the account identifier on behalf of the user device 102. In some embodiments, the issuance module 250 may generate an account identifier (e.g., a gift card account number) after receiving approval from the authorizing computer 136 (e.g., a computer operated by an issuer of the gift card).

In some embodiments, the issuance module 250 may enable the authorizing computer 136 to generate the account identifier on behalf of the issuance server computer 110 (or vice versa). For example, the issuance module 250, in conjunction with the data processor 221, may communicate the request to generate the new account identifier to the authorizing computer 136. The authorizing computer 136 can confirm that the user associated with the user device 102 has enough funds to issue the account identifier from an account at the authorizing computer 136 and, if so, generate the account identifier.

The issuance module 250 and the data processor 221 may be configured to populate the account (e.g., a gift card account) associated with the account identifier (e.g., a gift card account identifier) with funds from the account (e.g., a funding account such as a credit card account) associated with the user device 102. For example, the authorizing computer of the user may approve of a fund transfer to the new account identifier for the receiver (e.g., after receiving the authorization request message, etc.). If approved, the funds may be transferred to the account corresponding with the new account identifier (e.g., during settlement, etc.).

The issuance server computer 110 may implement a distribution module 255. The distribution module 255 may in conjunction with the data processor 221 provide the resource device 122 (e.g., a gift card) to the receiver (e.g., a gift card recipient). In some embodiments, the account identifier (e.g., a gift card account number) may be embodied on a card or other device, or may include an electronic transmission (e.g., an e-mail, SMS message, etc.) to the receiver device 120 such as a mobile phone. The receiver device 120 can show or transmit the account identifier to a resource provider computer 130 during a future transaction (e.g., after the account identifier is generated, etc.). In other embodiments, the receiver device 120 may not be needed at all. One example of a user interface for distributing the account identifier is at FIG. 7.

The distribution module 255 may in conjunction with the data processor 221 be configured to provide the account identifier to the receiver device 120. When the receiver (e.g., a gift account recipient) returns to a portal associated with the issuance module 250 with the issued account identifier, the issuance engine 116 can provide an option to the receiver (e.g., a gift account recipient) to provide the account identifier (e.g., a gift card account number) in a medium (e.g., a card, electronic account, etc.) specified by the receiver. Specific examples of devices that include the account identifier include physical ticket stubs, "prepaid" or gift cards, or other methods of providing the account identifier, such as smartcards with chips, debit devices (e.g., a debit card), or credit devices (e.g., a credit card). The device that includes the account identifier, in some embodiments, can include a substrate. While in some cases, the issuance server computer 110 may issue devices such as gift cards by itself or on behalf of an issuer operating the authorizing computer 136, in other embodiments, the issuance server computer 110 may instruct another computer such as the authorizing computer 136 to issue the devices.

The issuance server computer 110 may implement a resource provider database 270. Information about the resource provider may be stored with a resource provider database 270. The resource provider database 270 can include various resource provider information described herein (e.g., resource provider name, physical address, email address, phone number, etc.). The resource provider information may also be associated with a resource provider code and/or resource provider account identifier. The resource provider code may include a unique identifier of the resource provider to ensure that funds are transferred to the correct resource provider during clearing and settlement.

The resource provider database 270 can include various other information. For example, the received resource provider information may be stored in the resource provider database as identifying information for the resource provider. The resource provider database may also match resource provider information with a resource provider code (e.g., from an acquirer computer, from a processing network computer, etc.) and/or resource provider identifier (e.g., account identifier to accept funds from completed transactions, etc.).

In some embodiments, the resource provider database 270 may store other information associated with the resource provider as well, including a particular transport computer associated with the resource provider. As a sample illustration, the resource provider database (e.g., a merchant database) can correlate the resource provider's physical address or website (e.g., a merchant address or merchant website) with a resource provider code (e.g., a merchant code) and transport computer (e.g., an acquirer computer) that manages the resource provider's funds. When a transaction is received that only identifies the resource provider's physical address, the transport computer can identify other relevant information associated with the resource provider based on the correlations identified in the resource provider database 270.

In some embodiments, the resource provider database 270 may be populated with resource provider information without resource provider identifying itself or pre-enrolling with the resource provider database or other program.

The issuance server computer 110 may implement an account identifier database 275. The account identifier database 275 may include any information related to account identifiers. For example, account identifier database 275 may comprise data related to a single or multiple user accounts. For each user account, account identifier database 275 may store account identifiers or tokens (e.g., to replace the account identifier) and data related to the account identifiers.

The account identifier database 275 may include a stored value (e.g., a value of a gift card) associated with one or more of the account identifiers (e.g., a gift card account number) in the account identifier database 275. For example, the user device 102 may initiate the transmission of funds into an account associated with the account identifier and those funds may be tracked in the account identifier database 275. In some examples, the receiver of the account identifier may also be identified in the account identifier database 275. For example, the name of a gift card recipient can be stored in the database 275 along with the account number for the gift card and the value associated with the gift card.

User account information database 280 may comprise any information related to user accounts including a receiver profile. In some embodiments, user account information database 280 may comprise data related to one or more user accounts. In such cases, user account information database 280 may store data organized by user account with each user account made differentiable by any suitable identifier (e.g., user account identifier). For each user account, some examples of data that may be stored include a primary account number (PAN) or other identifier, user identification information, transaction history, and other information.

Figure 3:
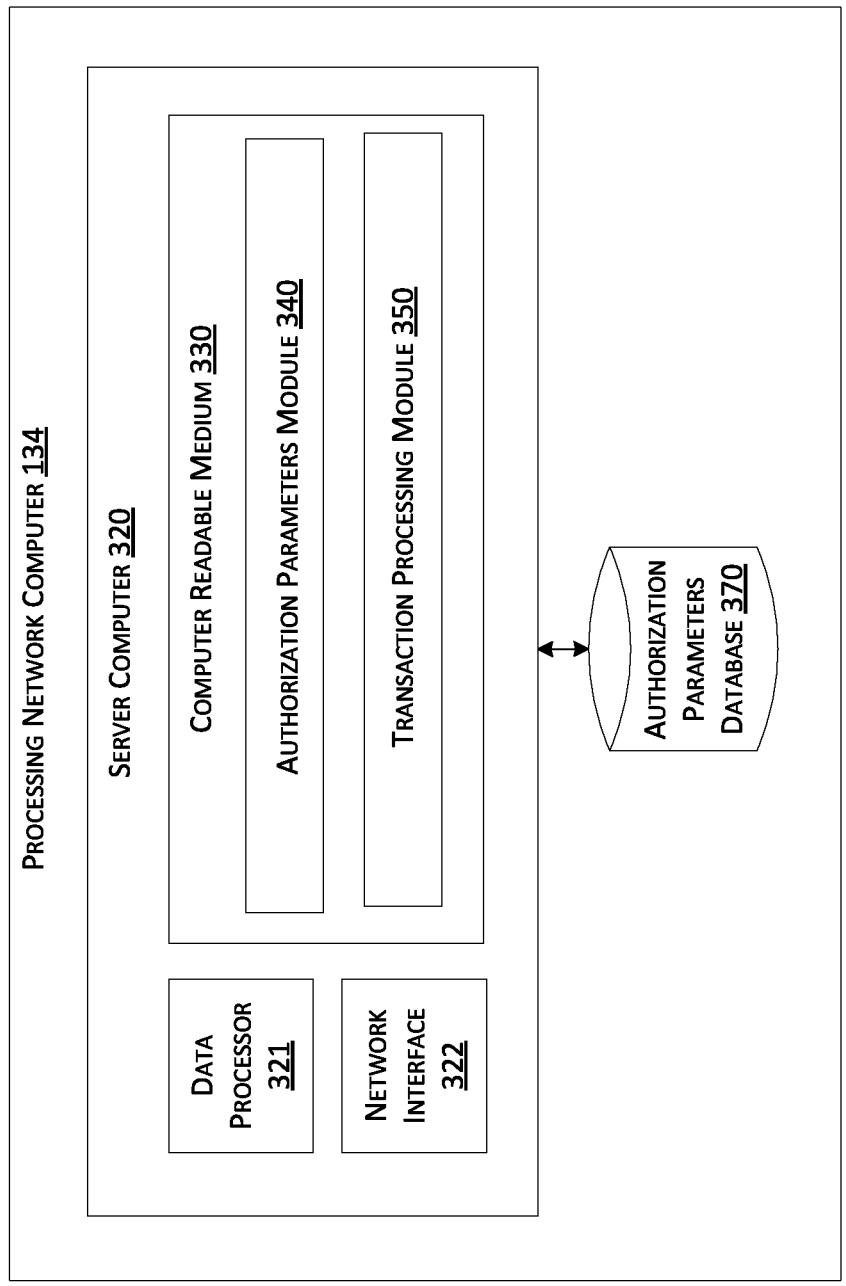
FIG. 3 illustrates a block diagram of a processing network computer according to an embodiment of the invention.

FIG. 3 shows a block diagram of an exemplary processing network computer 134 according to embodiments of the present invention. Processing network computer 134 includes a server computer 320 comprising a data processor 321, network interface 322, and a computer readable medium 330. The computer readable medium 330 may comprise a number of software modules including an authorization parameters module 340 and a transaction processing module 350.

Other modules and submodules may also reside on the computer readable medium 330. Examples of additional modules may include an authorization module for processing and routing authorization request and response messages, a clearing and settlement module for processing and routing clearing messages and performing settlement between parties, and data extraction (e.g., for retrieving data from external data sources such as databases) modules, storage modules, and message modification modules. Each module in processing network computer 134 may be combined with any of the additional modules as appropriate. Each module in processing network computer 134 may comprise one or submodules, where each submodule may comprise one or more functions implemented by code, executable by data processor 321.

Processing network computer 134 may also comprise several databases, including an authorization parameters database 370. Data processor 321 (e.g., a microprocessor) may process functions of server computer 320. Network interface 322 may be any suitable combination of hardware and software that enables data to be transferred to and from processing network computer 134.

The processing network computer 134 may implement an authorization parameters module 340. The authorization parameters module 340 can, in conjunction with the data processor 321, identify information associated with the resource device 122 (e.g., a phone with a gift card account or a gift card) and determine whether the resource device 122 is valid and/or authorized to conduct the transaction. As a sample illustration, the resource device 122 may only correspond with an Acme Co. resource provider. The identification of Acme Co. may correspond with the account identifier of the resource device 122, which can be stored with by authorization parameters module 340 at the authorization parameters database 370. When the resource provider computer 130 is Acme Co., the processing network computer 134 may authorize the transaction. In some embodiments, the processing network computer 134 may interact with the issuance server computer 110 to receive information about the resource device 122, user device 102, resource provider computer 130, or other entities or accounts associated with the transaction.

The authorization parameters module 340 may, in conjunction with the data processor 321, confirm a threshold value of funds are available in the account associated with the account identifier in order to approve the transaction. For example, a transaction amount and account identifier may be received at the authorization parameters module 340 in the authorization message. The authorization parameters module 340 may identify the funds that correspond with the account identifier. When the funds with the account identifier meet or exceed the funds identified with the authorization message, the authorization parameters module 340 may confirm validity and/or approve the transaction.

The authorization parameters module 340 may, in conjunction with the data processor 321, be configured to confirm other restrictions placed on the account (e.g., when the account identifier was generated, etc.). For example, the account identifier may be restricted for use with a single resource provider. The authorization parameters module 340 can confirm that the code corresponding with the resource provider is the same code that is included with the authorization request message. If not, the authorization parameters module 340 may decline the authorization request.

The processing network computer 134 may implement a transaction processing module 350. The transaction processing module 350, in conjunction with the data processor 321, can receive an authorization request message, process the authorization message, and/or transmit an authorization response message. A sample authorization request message may be similar to the message in FIG. 5.

Transaction processing module 350 may enable, with data processor 321, any processing related to conducting a transaction. Transaction processing module 333 may enable receiving, processing, and sending authorization request messages and authorization response messages. In some cases, transaction processing module 350 may store any transaction data retrieved during transaction processing in one or more databases, some of which may not be shown in FIG. 3. In some cases, transaction processing module 350 may further handle clearing and settlement processing.

After receiving the authorization request message, transaction processing module 350 may determine, with data processor 321, whether the authorization request message includes an account identifier. The transaction processing module 350 can access the account associated with the account identifier.

The processing network computer 134 may implement an authorization parameters database 370. The authorization parameters database 370 can store at least some of the information associated with the resource device 122 needed to determine whether the resource device 122 is valid and/or authorized to conduct the transaction. The information may include, for example, a particular resource provider that is associated with a particular account identifier.

Exemplary Methods Incorporating an Issuance Server Computer

Figure 4:
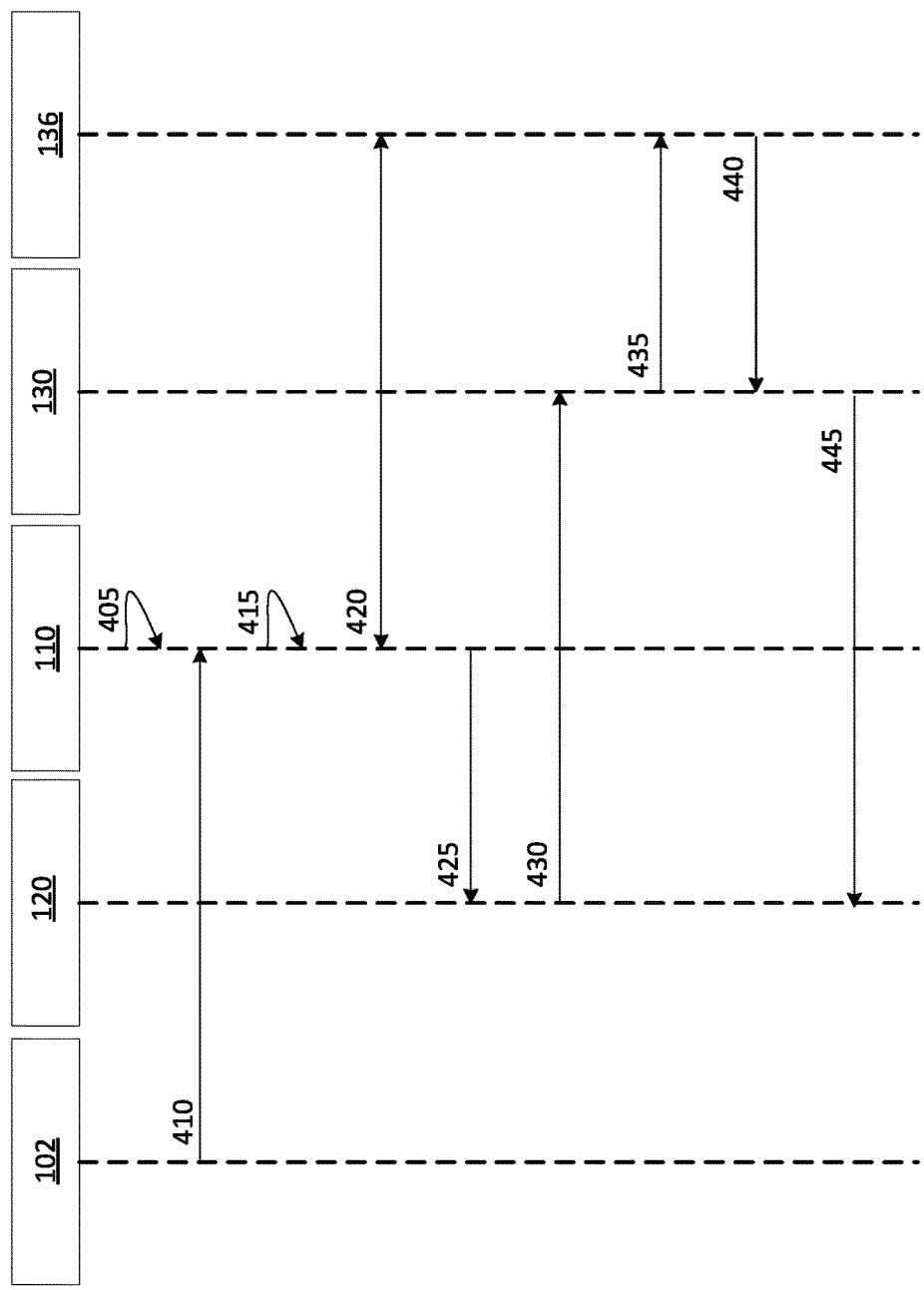
FIG. 4 illustrates an interaction flow diagram according to an embodiment of the invention.

FIG. 4 illustrates an exemplary flow diagram of an interaction between a user device 102, receiver device 120, issuance server computer 110, resource provider computer 130, and authorizing computer 136, according to an exemplary embodiment of the present invention. A transport computer, databases, or other computers or devices may be implemented in embodiments of the present invention, even though these computers are devices are removed for simplicity of the illustration.

I. Resource Provider Information Mapping

At step 405, the issuance server computer 110 receives or determines resource provider information. For example, the issuance server computer 110 can receive resource provider information (e.g., merchant information) from one or more transport computers (e.g., acquirer computers). The resource provider information may include a resource provider code or account identifier, confirm that the resource provider accepts payment devices other than cash, etc. In other examples, the issuance server computer 110 can determine resource provider information from passive communications with the resource provider (e.g., available through the resource provider's website or publicly-available information, etc.) or other methods discussed throughout the disclosure.

In some examples, the issuance server computer 110 can identify information about the resource provider through transactions. For example, a second user device (e.g., a credit card) used by a second user (e.g., a consumer), and the resource provider may conduct a transaction (e.g., to reserve a seat in a venue, to perform a transaction for goods or services, etc.). A resource provider code (e.g., a merchant code) that is used to identify the resource provider (e.g., a merchant) in that transaction with the second user may be included in an authorization message. The processing network computer 134 can identify the resource provider code in the authorization message by parsing the authorization message. The identified resource provider code may be stored in the resource provider database 270. In a future transaction, the resource provider may be identified in the resource provider database 270 based in part on that previous transaction with the second user device.

II. Issuance of an Account Identifier

At step 410, the user device 102 may provide resource provider information for an issuance server computer 110. This may be done because a user wants to give a gift card associated with a specific merchant that does not normally offer gift cards to a gift card recipient. In some embodiments, the user device 102 may identify the resource provider by a website address, phone number, or other resource provider information accessible to the user device 102 described throughout the disclosure. The user device 102 may also access a brick-and-mortar store associated with the resource provider to identify the resource provider information. In some embodiments, the user device 102 may not have access to the resource provider code and may identify the resource provider through these other means.

Figure 6:
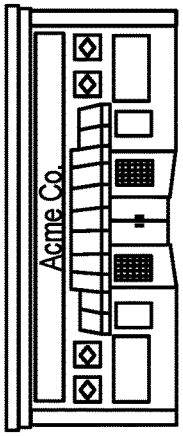
FIG. 6 shows an exemplary user interface to request an account identifier according to embodiments of the present invention.

The user device 102 may request an account identifier (e.g., for a gift card and/or stored value device, etc.) using the information identifying the resource provider (e.g., small business Acme Co.) from the issuance server computer 110. The request for the account identifier may correspond with the receiver device 120. For example, the user device 102 may access the issuance server computer 110 through an application programming interface (API), portal, website, software application available on the user device 102. The user device 102 can provide the resource provider information to the issuance server computer 110 during the request. The user device 102 may also include a value associated with the account identifier. The value may correspond with the account identifier (e.g., a maximum value that will correspond with the account identifier, a gift card, etc.), user account information that will fund the account identifier, identification of the receiver device 120 (e.g., phone number, email, name, address, etc.), or any restrictions associated with the account identifier (e.g., only for a particular resource provider at a particular location, etc.). A sample embodiment of a user interface to request an account identifier is illustrated in FIG. 6.

The issuance server computer 110 can receive the request from the user device 102. The issuance server computer 110 may parse the request to identify the resource provider information, user device 102 account information (e.g., user's name, identifier for an authorizing computer, etc.), and the requested value associated with the account identifier.

At step 415, the issuance server computer 110 can access the resource provider database. For example, the issuance server computer 110 can communicate with the resource provider database to access previously-provided information about one or more resource providers. The issuance server computer 110 can access additional information about resource providers from the resource provider database.

The issuance server computer 110 can match information in the resource provider database with information received from the user device 102 to identify the resource provider. For example, the address provided by the user device 102 of the resource provider may match a previously-provided address of a resource provider stored in the resource provider database.

The issuance server computer 110 can confirm that the resource provider identified by the user device 102 is the resource provider identified by the issuance server computer 110. As a sample illustration, the user device 102 may identify "Acme Co. on Main Street" as the resource provider for the account identifier. The issuance server computer 110 can access the resource provider database to identify one or more resource providers associated with the description and provide a list, map, images, website addresses, or other additional information of resource providers that match the information provided by the user device 102. When the user device 102 identifies one of the resource providers from the additional information, the issuance server computer 110 can access the resource provider database (e.g., the resource provider code, etc.) to further clarify the appropriate resource provider and receive additional information associated with the identified resource provider.

The issuance server computer 110 can determine a resource provider code with the matched resource provider entry in the resource provider database 270. For example, the issuance server computer 110 can receive a resource provider address from the user device 102, access the resource provider database 270 to identify the resource provider account identifier associated with the particular resource provider address, and return the resource provider code and/or acquirer associated with the resource provider for use with the device. Other information may be accessed as well without diverting from the essence of the disclosure.

At step 420, the issuance server computer 110 can generate and transmit a request for generation of the account identifier from an authorizing computer 136. For example, the authorizing computer 136 may be associated with an account for the user device 102 that will fund the account identifier for the receiver device 120. The issuance server computer 110 can interact with the authorizing computer 136 to confirm the account for the user device 102 is authorized to fund the value associated with the account identifier for the receiver device 120.

The authorizing computer 136 can generate and transmit a response to the request. The response message may authorize funding of the account identifier for the receiver device 120. For example, the authorizing computer 136 can confirm that funds are available in the account for the user device 102 and authorize the generation of the account identifier for the receiver device 120 (e.g., using funds from the user device 102).

Figure 7:
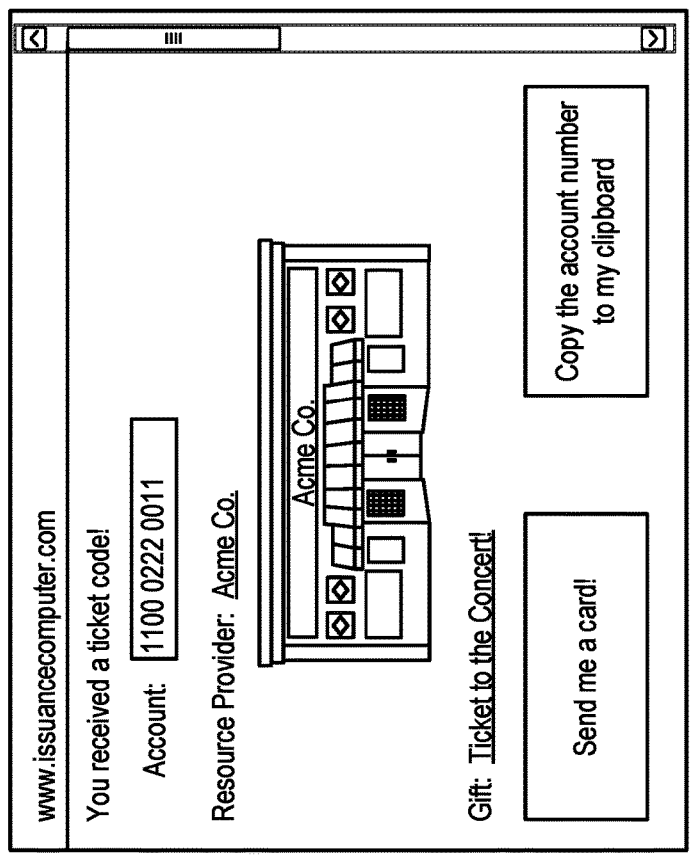
FIG. 7 shows an exemplary user interface for providing the account identifier according to embodiments of the present invention.

At step 425, the issuance server computer 110 can enable access of the account identifier for the receiver device 120. For example, the account identifier may be sent to the receiver device 120, based in part on the form of the account identifier (e.g., an electronic transmission, physical mail, text message, etc.). A sample embodiment of a user interface to receive the issued account identifier is illustrated in FIG. 7.

The receiver device 120 can receive the account identifier. For example, after identifying the type of device that will embody the account identifier, the issuance server computer 110 can transmit the account identifier to the receiver device 120 (e.g., electronically transmits the account identifier without a physical substrate, mail a physical card, etc.).

In other embodiments, instead of transmitting the account identifier to the receiver device 120, the issuance server computer 110 may initiate the creation of a resource provider device (e.g., a gift card) and may have it mailed to the receiver (e.g., a gift card recipient).

III. Transaction Processing

At step 430, the receiver device 120 can access the resource provider computer 130. For example, the receiver device 120 may visit a brick-and-mortar store associated with the resource provider computer 130. In another example, the receiver device 120 may visit a website for the resource provider computer 130, which offers goods and services electronically. In yet another example, the receiver device 120 may visit a venue and provide the account identifier to the resource provider computer 130 to obtain access to a seat at the venue.

This interaction between the receiver device 120 and the resource provider computer 130 may be the first time the resource provider is notified of the account identifier. For example, the user device 102 may identify the resource provider to the issuance server computer 110 without knowledge of the resource provider and/or without the resource provider registering/enrolling with the issuance server computer 110.

The receiver device 120 may use the account identifier to conduct a transaction with the resource provider computer 130 for goods or services. For example, the receiver device 120 may tap, swipe, or otherwise provide the account identifier to the resource provider (e.g., by swiping a card that embodies the account identifier at an access device operated by the resource provider, etc.).

At step 435, the resource provider computer 130 may generate an authorization request message that includes the account identifier in order for the receiver to purchase the goods or services. Other data may be included with the authorization request message as well, including the resource provider identifier/code, sale amount of the goods or services, and/or other information described herein.

In some embodiments, the authorization request message may be transmitted from the resource provider computer 130, to the transport computer 132, and then to a processing network computer 134 (not shown in FIG. 4). The processing network computer 134 can confirm that the resource provider identified by the account identifier is the same resource provider that is conducting the transaction with the receiver device 120 (e.g., based on one or more authorization parameters or constraints identified by the user device 102, limited to "Acme Co. on Main Street," etc.).

The processing network computer 134 may identify the resource provider computer 130 using various methods. For example, the processing network computer 134 can identify the resource provider from information stored in the authorization request message. In another example, the processing network computer 134 can identify the resource provider by accessing information in the resource provider database 270 and matching that stored information with information received from the receiver device 120. In some examples, the processing network computer 134 may interact with the issuance server computer 110 to verify the information associated with the authorization request message.

If the authorization request message is originated by a resource provider that is not the right or authorized resource provider for the account identifier, then the processing network computer 134 may deny the authorization and send an authorization response message indicating this. In this case, the authorizing computer 136 may not see any authorization request message. If the resource provider is the correct or authorized resource provider, the processing network computer 134 may forward the authorization request to the authorizing computer 136 for approval or may authorize the transaction on behalf of the authorizing computer 136 (e.g., if the processing network computer 134 performs stand in processing for the authorizing computer 136, etc.).

At step 440, the authorizing computer 136 may authorize or decline the transaction (e.g., based in part on funds associated with the account identifier for the resource device 122, based on fraud determinations, etc.). For example, the authorizing computer 136 may receive the account identifier, access the account identifiers database 275 (e.g., to confirm that the value in the authorization request message is at least available in the account associated with the account identifier), and authorize the transaction. The authorizing computer 136 may decline the authorization request otherwise (e.g., when there are insufficient funds, when the account has been compromised, etc.).

The authorizing computer 136 may generate an authorization response message. The authorization response message may include the authorization result determined by the processing network computer 134 or the authorizing computer 136. In some cases, authorizing computer 136 may also include information related to a fraud analysis. The authorizing computer 136 may send the authorization response message to processing network computer 134 to transport computer 132 and from transport computer 132 to resource provider computer 130, respectively via any suitable communications network.

The resource provider computer 130 computer may receive the authorization response message from transport computer 132. The resource provider computer 130 may determine whether to allow the transaction based on the information in the received authorization response message. If the resource provider decides to approve the transaction, the transaction may be authorized and completed. A transaction amount associated with the transaction may eventually be debited from the account associated with the account identifier. In some cases, a notification may be displayed by resource provider computer 130 or may be sent to the receiver device 120 indicating whether the transaction was successfully completed.

In some cases, at a later time (e.g., at the end of the day), a clearing and settlement process can occur between transport computer 132, processing network computer 134, and authorizing computer 136.

While an embodiment in which the transaction is conducted using a contact transaction channel is described (e.g., magnetic-stripe transaction) with respect to FIG. 4, transactions may be performed in other transaction channels. For example, resource device 122 (e.g., a device that embodies the account identifier used by receiver device 120, etc.) may be utilized in a contactless transaction channel. In another case, resource device 122 may be utilized in an e-commerce transaction channel, in which the user may key-enter the account identifier embedded with resource device 122 into a transaction data field of a network page hosted by the resource provider.

More than one account identifier may correspond with a receiver, each of which may be stored with a profile for the receiver. In some embodiments, a first account identifier may be received and identified with the profile of the receiver. The profile may also identify a second account identifier. The second account identifier may correspond with the existing account or profile of the receiver device 120. Either the first or the second account identifier may be used for the transaction, despite which identifier is embodied with the resource device 122.

As a sample illustration, the receiver device 120 may register the account identifier received from the user device 102 with the existing account or profile of the receiver device 120. The resource provider computer 130 can receive the second account identifier and generate an authorization message with the second account identifier (e.g., to help pay for goods and services, etc.). When the receiver device 120 conducts a transaction with the second account identifier, the authorizing computer 136 can instead use the account identifier received from the user device 102. The funds may be withdrawn from the account associated with the received from the user device 102 instead of the existing account of the receiver device 120.

At step 445, the resource provider computer 130 may provide access to the resource to the receiver device. For example, the resource provider may provide the goods to the receiver in exchange for transferring the funds from the account corresponding with the account identifier. In another example, the receiver may be permitted to enter the venue and access a seat corresponding with the account identifier.

Embodiments of the invention are directed to methods, systems, apparatuses, and computer-readable mediums for identifying a resource provider for a transaction without resource provider identifying itself or pre-enrolling with the system. The system can allow for (1) identifying a resource provider with or without the resource provider identifying itself and (2) enabling a transfer of funds or other access to a resource from a user device 102 to a receiver device 120. During a transaction with the issued account identifier, the system may be accessed by one or more existing computer systems (e.g., at a processing network, etc.) to confirm whether the account identifier is valid (e.g., to approve or decline the transaction).

Embodiments of the invention provide a number of technical advantages. For example, one technical advantage is fewer communications. By not requiring the resource provider to pre-enroll in the system, the resource provider does not need to request enrollment (via a communication). The resource provider can also save time, in some embodiments, by implementing a stored value program without requiring a resource provider to enroll in the program. Embodiments of the invention also do not require resource providers to maintain their own account identifiers for receiver devices.

Embodiments of the invention also solve a problem that did not exist before the invention of computers. For example, a consumer wants to purchase a gift card for a specific resource provider. The consumer provides information identifying a resource provider (e.g., phone number, website, etc.), which is matched with other sources of information about resource providers (e.g., information from acquirer computers, previous transactions where resource providers participated, passive communications with the resource provider, etc.). A gift card is generated for the specific resource provider to encourage a receiver to shop there, which includes a resource provider code in order to conduct a transaction. In a pre-computer world, the consumer would have given the receiver cash, with no restriction/motivation for the receiver to shop at the particular resource provider's store.

Exemplary Transaction Message

Figure 5:
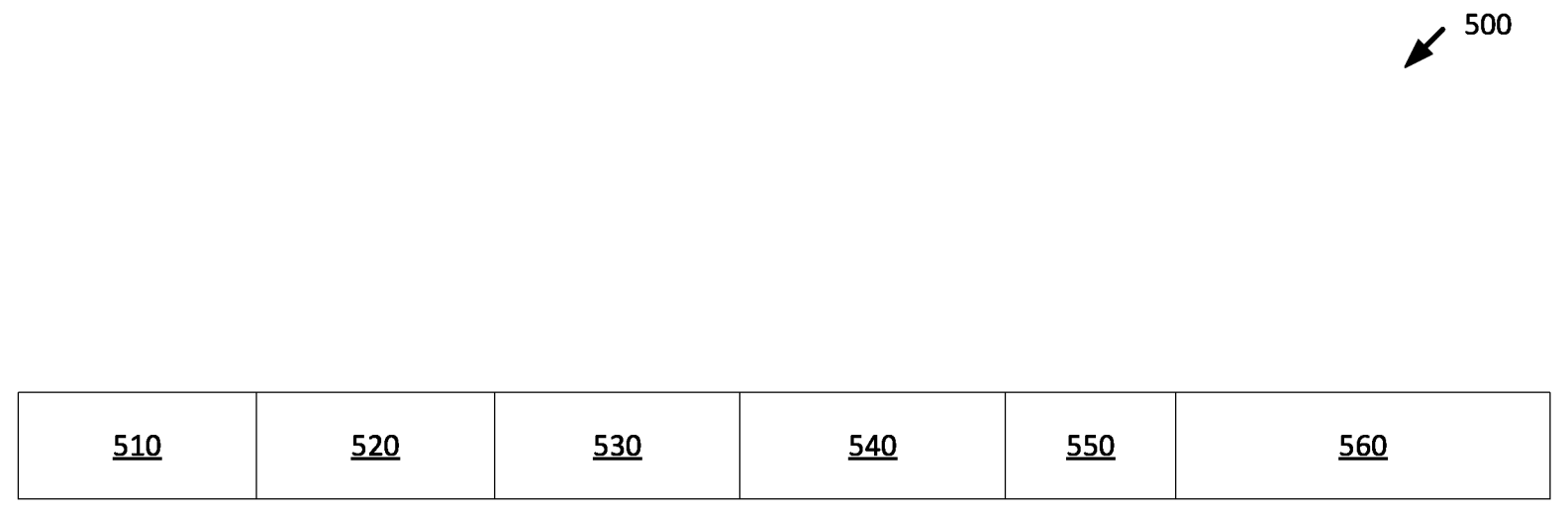

FIG. 5 shows an exemplary authorization request message 500 according to embodiments of the invention. In some embodiments, authorization request message 500 may include an account identifier 510 (e.g., primary account number (PAN), account identifier associated with a resource device 122, etc.), an expiration date 520 (e.g., PAN expiration date), a card verification value (CVV) 530, a transaction channel identifier 540, resource provider data 550, and additional data 560. In some cases, the transaction channel identifier 540 may also be known as the POS entry mode. In some cases the card verification value (CVV) 530 may be a dynamic CVV. While FIG. 5 shows one exemplary authorization request message, it is understood that the authorization request message may include fewer or more elements than depicted by authorization request message 500.

The account identifier 510 may be any string of characters that identify an user associated with an account. The account identifier 510 enables entities such as resource providers and transport computers to identify accountholders when performing various actions. Such actions include, but are not limited to: fraud and risk checks on transaction authorization requests, fraud and risk reviews after transactions are completed, performance of value added services (e.g., loyalty, backend applications, reporting), and transaction feeds for third party value added applications.

The resource provider data 550 may be any string of characters that identify a resource provider (e.g., resource provider code, unique identifier corresponding to each resource provider, etc.). The resource provider data 550 can, for example, store the resource provider code associated with the resource provider that is performing the transaction. For example, the resource provider receives the account identifier from the user and generates the authorization request message 500. The resource provider can add the received account identifier to account identifier 510 in authorization request message 500 and its own identifier to resource provider data 550 in authorization request message 500.

Additional data 560 may be any information that may be utilized by entities when processing authorization request message 500. For example, additional data 560 may comprise a dollar amount value of the transaction, user identification data (e.g., name), and other information. In some cases, the resource provider computer associated with the access device may define the dollar amount value (e.g., or seat identifier at a venue, etc.) associated with the transaction and then include the dollar amount value in authorization request message 500 as part of additional data 560. Any of additional data 560 may provide the processing network and the authorization computer with additional information that can be utilized for fraud models, which may enable greater security for transactions.

Exemplary User Interfaces

FIG. 6 shows an exemplary user interface to request an account identifier according to embodiments of the present invention. For example, a user may access a network page 600 for providing information to identify a resource provider. The network page may be hosted by an issuance server computer 110 or other computer described herein.

The user can provide a resource provider's name, website, phone number, email or physical address, formal or informal business name, image of the business or logo, directory, or other information. In some examples, the information received from the user through the network page 600 can be stored in the resource provider database 270.

The resource provider information may also be associated with a resource provider code and/or resource provider account identifier. The resource provider code may include a unique identifier of the resource provider to ensure that funds are transferred to the correct resource provider during clearing and settlement. The resource provider database 270 (or corresponding modules implemented by issuance server computer 110) may also match resource provider information with a resource provider code (e.g., from an acquirer computer, from a processing network, etc.) and/or resource provider identifier.

The user may provide receiver information to the network page 600. For example, the user may identify a receiver's device identifier (e.g., phone number, etc.), name, email address, or other information. The user may provide their own information as well. This may include the user's name, phone number, email, or other relevant information. The user may also provide a source account identifier. The source account identifier can identify the source of funds that can be added as value to the new account identifier.

The information provided to the network page 600 can be stored in one or more databases. For example, the receiver and user information may be stored with the user account information database 280. The identified resource provider information may be stored with the resource provider database 270.

In some examples, the issuance server computer 110 may receive the information from the network page 600 and match the information with previously stored data (e.g., from the resource provider database 270). If a resource provider is found (e.g., by matching the received name with a stored name or image, etc.), the issuance server computer 110 may supplement the provided information with stored information from the resource provider database 270.

In some embodiments, resource providers may be suggested. For example, one or more resource providers may be suggested based on user input (e.g., suggestions for the user or receiver based on the receiver's past purchases, but general enough to where the user may not be able to infer what kind of resource providers the receiver shops at, etc.). In other examples, resource providers may be suggested based on location or resource provider preferences.

FIG. 7 shows an exemplary user interface for providing the account identifier according to embodiments of the present invention. For example, the network page 700 can provide the account identifier to a receiver and identify the corresponding resource provider for the account identifier (e.g., an image of the resource provider, address, etc.).

The account identifier can be provided through various means, including through network page 700. For example, the authorizing computer may provide the account identifier on a device directly to the receiver. When the account identifier is embodied in an electronic (e.g., non-substrate) medium by the authorizing computer, the receiver may access the account identifier at the issuer and/or through the network page 700 (e.g., hosted by issuance server computer 110 or via network page 700, etc.).

In some embodiments, the receiver may be sent a redemption code (e.g., a unique identifier of an account with a message describing the purpose of the redemption code as a gift card, etc.). The redemption code may be sent to the receiver device through various methods (e.g., email, text message, etc.). When the receiver communicates with the issuance server computer 110 and provides the redemption code (e.g., to network page 700), the issuance server computer 110 can provide the receiver with options on mediums to receive the account identifier. The network page 700 may allow the receiver to identify the type of device to more easily provide the account identifier that they want to receive (e.g., provision to the receiver device, print, email, text message, receive a quick response (QR) code, mail a physical card to the receiver's address, etc.).

In some embodiments, the receiver may accept the account identifier by accessing network page 700. When the receiver accesses network page 700, the amount provided by the user device 102 may be added to the account associated with the account identifier of the receiver device 120 and removed from the account associated with the user device 102 (e.g., associated with a profile of the receiver). When the receiver does not accept the account identifier (e.g., 30-days, 60-days, etc.), the amount may remain or be returned to the account associated with the user device 102 (e.g., the unencumbered value initially paid by the user device 102). In some embodiments, the receiver may not communicate with the issuance server computer 110 within a threshold amount of time (e.g., by accessing the network page 700 to provide the redemption code, by receiving the account identifier, by spending the funds associated with the account identifier, within one-year of issuance, etc.). The funds may be returned to the user device 102 and/or credited back to the account associated with the user device 102. This may be beneficial to ensure that the account identifier is not associated with unused funds for long periods of time.

In some embodiments, the account identifier is embodied in a prepaid gift card that is mailed to the receiver or otherwise delivered to the receiver (e.g., through the user device 102 as a gift). In such embodiments, the prepaid gift cards may be printed with logos, pictures, or marks associated with the resource providers for which the gift cards may be used. In other embodiments, a backing or other printed material may accompany the gift card so that the receiver of the gift card knows that the gift card can only be used at the specific resource provider(s) indicated.

In some embodiments, the resource provider computer 130 may provide offers (e.g., up-sales, value adds, etc.) to the user device 102, receiver device 120, or other computers. For example, when provided to the user device 102, the offer may be provided at time of purchase of the account identifier. When provided to the receiver device 120, the offer may be provided at time of purchase of goods or services using the account identifier. In some embodiments, the selected resource provider or similar resource providers may provide the offers.

In some embodiments, resource providers may be suggested. For example, one or more resource providers may be suggested based on receiver or user device 102 input (e.g., suggestions for the user device 102 based on the receiver's past purchases, but general enough to where the user device 102 is not able to infer what kind of resource providers the receiver shops at, etc.). In other examples, resource providers may be suggested based on location or resource provider preferences.

In some embodiments, the network page 700 may receive feedback. For example, if a resource provider policy changes in accepting a gift card, the receiver can report the changed policy to the issuance server computer 110 and/or network page 700. In some embodiments, the computer can enable a transfer of the amount associated with the account identifier to another resource provider.

System Devices

A portable communication device may be implemented. For example, the portable communication device may include circuitry that is used to enable certain device functions, such as telephony. The functional elements responsible for enabling those functions may include a processor that is programmed to execute instructions that implement the functions and operations of the device. The processor may access data storage (or another suitable memory region or element) to retrieve instructions or data used in executing the instructions. Data input/output elements may be used to enable a user to input data (via a microphone or keyboard, for example) or receive output data (via a speaker, for example). A display may also be used to output data to a user. A communications element may be used to enable data transfer between device and a wireless network (via antenna, for example) to assist in enabling telephony and data transfer functions. The device may also include a contactless element interface to enable data transfer between contactless element and other elements of the device, where the contactless element may include a secure memory and a near field communications data transfer element (or another form of short range communications technology). As noted, a mobile phone or similar device is an example of the portable communication device that may be used to display alerts. However, other forms or types of devices may be used without departing from the underlying concepts of the invention. Further, devices that are used to display alerts may not require the capability to communicate using a cellular network in order to be suitable for use with embodiments of the present invention.

An account identifier may be embedded or otherwise correspond with a device. (e.g., portable consumer device in the form of a card that includes a contactless element and that may be used to initiate a transaction, etc.). The device may be a "smart card" or similar device, such as a prepaid, credit, or debit type card in which a chip is embedded. One form of such a device is known as an EMV (Europay™, MasterCard™ and Visa™) card. In the context of the present invention, EMV refers to a standard for interoperation of IC cards ("chip cards") and IC card capable point of sale (POS) terminals and automated teller machines (ATM), and is used for authenticating credit and debit cards and/or corresponding account identifiers. The EMV standard defines the interactions at the physical, electrical, data and application levels between IC cards and IC card processing devices for use in financial transactions.

The card may comprise a substrate that provides the form factor for the device. A contactless element for interfacing with a data access or data transfer device may be present on, or embedded within, the substrate. The contactless element may include a chip or other form of data storage element. Contactless element may include the capability to communicate and transfer data using a near field communications (NFC) technology or other short range communications technology. Consumer information such as an account identifier, expiration date, and consumer name may be printed or embossed on the card. Although not necessary for operation as a contactless device, the device may include a magnetic stripe on the substrate, where the magnetic stripe permits access to contactless element. This may be used to provide access to data stored in, or the functions of, the chip that is part of the contactless element by a terminal using a magnetic stripe reader.

The various participants and elements described herein with reference to FIG. 1 may operate one or more computer apparatuses to facilitate the functions described herein. Any of the elements in FIG. 1, including any servers or databases, may use any suitable number of subsystems to facilitate the functions described herein.

Various subsystems or components may be implemented. The subsystems may be interconnected via a system bus. Additional subsystems such as a printer, keyboard, fixed disk (or other memory comprising computer readable media), monitor, which is coupled to display adapter, and others may be implemented. Peripherals and input/output (I/O) devices, which couple to I/O controller (which can be a processor or other suitable controller), can be connected to the computer system by any number of means known in the art, such as serial port. For example, serial port or external interface can be used to connect the computer apparatus to a wide area network such as the Internet, a mouse input device, or a scanner. The interconnection via system bus can allow the central processor to communicate with each subsystem and to control the execution of instructions from system memory or the fixed disk, as well as the exchange of information between subsystems. The system memory and/or the fixed disk may embody a computer readable medium.

Embodiments of the invention are not limited to the above-described embodiments. For example, although separate functional blocks are shown for an authorizing computer, processing network computer, and transport computer, some entities perform all of these functions and may be included in embodiments of invention.

Specific details regarding some of the above-described aspects are provided above. The specific details of the specific aspects may be combined in any suitable manner without departing from the spirit and scope of embodiments of the invention. For example, back end processing, data analysis, data collection, and other transactions may all be combined in some embodiments of the invention. However, other embodiments of the invention may be directed to specific embodiments relating to each individual aspect, or specific combinations of these individual aspects.

It should be understood that the present invention as described above can be implemented in the form of control logic using computer software (stored in a tangible physical medium) in a modular or integrated manner. Based on the disclosure and teachings provided herein, a person of ordinary skill in the art may know and appreciate other ways and/or methods to implement the present invention using hardware and a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention may become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method comprising:
   receiving, by a merchant database in communication with a server computer from one or more data sources, a plurality of merchant codes;
   receiving, by the server computer and from a user device, information identifying a merchant, wherein the information does not include a merchant code associated with the merchant;
   accessing, by the server computer, the plurality of merchant codes in the merchant database;
   matching, by the server computer, the information identifying the merchant with the merchant code from the plurality of merchant codes;
   based on receiving the information identifying the merchant and matching the information with the merchant code, determining, by the server computer, that the merchant did not enroll with the server computer;
   generating a profile for the merchant, wherein the generation of the profile is based at least in part on the determination that the merchant did not enroll with the server computer, wherein the information identifying the merchant is stored with the profile for the merchant;
   determining an account identifier associated with the merchant code, wherein the account identifier is also stored with the profile for the merchant; and
   providing the account identifier to a user, wherein the account identifier is provided during a future transaction with a point of sale (POS) terminal of the merchant.

2. The method of claim 1, wherein the merchant code is used during settlement of the future transaction, and wherein the merchant is not contacted about the account identifier prior to determining the account identifier.

3. The method of claim 1, wherein at least some of the plurality of merchant codes are identified from a source other than the merchant.

4. The method of claim 3, wherein the source that identifies the at least some of the plurality of merchant codes is an authorization message for a second transaction unassociated with the user device.

5. The method of claim 3, wherein the source that identifies the at least some of the plurality of merchant codes is each merchant.

6. The method of claim 1, wherein the merchant code uniquely identifies the merchant.

7. The method of claim 1, wherein the information identifying the merchant comprises a name, phone number, email, website, or image of the merchant.

8. The method of claim 1 further comprising:
   receiving a transaction message from a second user device, wherein the transaction message comprises a second merchant code;
   determining that the second merchant code is not in the merchant database; and adding the second merchant code to the merchant database.

9. The method of claim 1, wherein providing the account identifier to the user comprises providing the account identifier on a card to the user.

10. The method of claim 1, wherein the merchant does not know that the account identifier was provided to the user before the account identifier is used at the merchant.

11. The method of claim 1, wherein receiving the plurality of merchant codes from the one or more data sources include an acquirer computer, an issuer computer, or from transaction data.

12. A server computer comprising:
a processor;
a merchant database comprising a plurality of merchant codes; and
a computer readable medium, the computer readable medium comprising code, executable by the processor, to implement a method comprising:
receiving, by the merchant database, a plurality of merchant codes;
receiving, from a user device, information identifying a merchant, wherein the information does not include a merchant code associated with the merchant;
accessing the plurality of merchant codes in the merchant database;
matching the information identifying the merchant with the merchant code from the plurality of merchant codes;
based on receiving the information identifying the merchant and matching the information with the merchant code, determining, by the server computer, that the merchant did not enroll with the server computer;
generating a profile for the merchant, wherein the generation of the profile is based at least in part on the determination that the merchant did not enroll with the server computer, wherein the information identifying the merchant is stored with the profile for the merchant;
determining an account identifier associated with the merchant code, wherein the account identifier is also stored with the profile for the merchant; and
providing the account identifier to a user, wherein the account identifier is provided during a future transaction with a point of sale (POS) terminal of the merchant.

13. The server computer of claim 12, wherein the merchant code is used during settlement of the future transaction, and wherein the merchant is not contacted about the account identifier prior to determining the account identifier.

14. The server computer of claim 12, wherein at least some of the plurality of merchant codes are identified from a source other than the merchant.

15. The server computer of claim 14, wherein the source that identifies the at least some of the plurality of merchant codes is an authorization message for a second transaction unassociated with the user device.

16. The server computer of claim 14, wherein the source that identifies the at least some of the plurality of merchant codes is each merchant.

17. The server computer of claim 12, wherein the merchant code uniquely identifies the merchant.

18. The server computer of claim 12, wherein the information identifying the merchant comprises a name, phone number, email, website, or image of the merchant.

19. The server computer of claim 12, wherein the method further comprises:
receiving a transaction message from a second user device, wherein the transaction message comprises a second merchant code;
determining that the second merchant code is not in the merchant database; and
adding the second merchant code to the merchant database.

20. The server computer of claim 12, wherein providing the account identifier to the user comprises providing the account identifier on a card to the user.

21. The server computer of claim 12, wherein the merchant does not know that the account identifier was provided to the user before the account identifier is used at the merchant.

* * * * *